United States Patent
Krupashankar

(10) Patent No.: US 12,353,315 B2
(45) Date of Patent: Jul. 8, 2025

(54) RULE BASED AUTOMATION

(71) Applicant: FAIR ISAAC CORPORATION, Roseville, MN (US)

(72) Inventor: Sowmya Pissay Krupashankar, Bangalore (IN)

(73) Assignee: FAIR ISAAC CORPORATION, Minneapolis, MN (US)

( * ) Notice: Subject to any disclaimer, the term of this patent is extended or adjusted under 35 U.S.C. 154(b) by 0 days.

(21) Appl. No.: 17/745,494

(22) Filed: May 16, 2022

(65) Prior Publication Data

US 2023/0367693 A1 Nov. 16, 2023

(51) Int. Cl.
*G06F 11/3604* (2025.01)
*G06F 8/73* (2018.01)
*G06F 11/3668* (2025.01)

(52) U.S. Cl.
CPC .......... *G06F 11/3604* (2013.01); *G06F 8/73* (2013.01); *G06F 11/3684* (2013.01)

(58) Field of Classification Search
CPC ..... G06F 11/3604; G06F 11/3684; G06F 8/73
See application file for complete search history.

(56) References Cited

U.S. PATENT DOCUMENTS

| | | | | |
|---|---|---|---|---|
| 6,681,243 B1* | 1/2004 | Putzolu | ............ | H04L 67/34 709/217 |
| 10,430,319 B1* | 10/2019 | Tokappa | ............ | G06F 11/3692 |
| 10,810,110 B1* | 10/2020 | Thomas | ............ | G06F 11/3664 |
| 11,086,765 B2* | 8/2021 | Mukherjee | ............ | G06F 11/3688 |
| 2009/0300711 A1* | 12/2009 | Tokutani | ............ | G06F 21/6218 726/1 |
| 2012/0131392 A1* | 5/2012 | Bendig | ............ | G06F 8/34 714/48 |
| 2015/0199228 A1* | 7/2015 | Pike | ............ | G06F 8/30 714/38.1 |
| 2018/0011780 A1* | 1/2018 | Aggarwal | ............ | G06F 11/36 |
| 2018/0217920 A1* | 8/2018 | Bhojan | ............ | G06F 11/3684 |
| 2019/0213355 A1* | 7/2019 | Raviv | ............ | G06F 16/901 |
| 2019/0370160 A1* | 12/2019 | Raman | ............ | G06F 16/9024 |
| 2020/0104241 A1* | 4/2020 | Talukdar | ............ | G06F 11/3684 |

(Continued)

OTHER PUBLICATIONS

Anonymous, "Gherkin Reference" 2020 [downloaded on Jun. 14, 2023], pp. 1-19, downloaded from <url>:https://web.archive.org/web/20201209084416/https://cucumber.io/docs/gherkin/reference. (Year: 2020).*

(Continued)

*Primary Examiner* — S. Sough
*Assistant Examiner* — Stephen D Berman
(74) *Attorney, Agent, or Firm* — Mintz, Levin, Cohn, Ferris, Glovsky and Popeo, P.C.

(57) ABSTRACT

Software validation systems, products, and methods for determining a plurality of test scenarios for a software code under test. The test scenarios may be defined based on at least one of values assigned to one or more variables declared in the software code, relationships defined between the one or more variables, and execution paths leading to one or more outcomes based on the values and the relationships, in response to the software code being executed. At least two or more test scenarios, from among the plurality of test scenarios, are consolidated into a first test scenario based on values defined in a modifiable script.

11 Claims, 4 Drawing Sheets

(56) References Cited

U.S. PATENT DOCUMENTS

| | | | |
|---|---|---|---|
| 2020/0174917 A1* | 6/2020 | Patel | G06F 8/42 |
| 2022/0147438 A1* | 5/2022 | Gadagi | G06F 11/3692 |
| 2022/0283931 A1* | 9/2022 | Vardi | G06F 11/3684 |
| 2023/0085946 A1* | 3/2023 | Nolan | G06F 9/54 |
| | | | 715/700 |

OTHER PUBLICATIONS

Lakshay Sharma et al., "Data Driven Testing using JSON with Cucumber," 2021 [retrieved on Jun. 14, 2023], pp. 1-27, downloaded from <url>:https://toolsqa.com/selenium-cucumber-framework/data-driven-testing-using-json-with-cucumber. (Year: 2021).*

Anonymous, "10 Minute Tutorial," 2020 [retrieved on Jun. 14, 2023], pp. 1-22, downloaded from <url>:https://web.archive.org/web/20201227101326/https://cucumber.io/docs/guides/10-minute-tutorial. (Year: 2020).*

Anonymous, "TestNG," 2020 [retrieved on Jun. 14, 2023], pp. 1-27, downloaded from <url>:https://web.archive.org/web/20200416204658/https://testng.org/doc/documentation-main.html#annotations. (Year: 2020).*

Anonymous, "Cucumber Reference," 2020 [retrieved on Jun. 14, 23], pp. 1-23, downloaded from <url>:https://web.archive.org/web/20201127114014/https://cucumber.io/docs/cucumber/api/ (Year: 2020).*

Anonymous, "Step Definitions," Sep. 19, 2020 [retrieved on Feb. 24, 2024], p. 1, downloaded from <url>:https://web.archive.org/web/20200919115416/http://cucumber.io/docs/cucumber/step-definitions. (Year: 2020).*

Florian-Pascal Hild, "Exploring Behavioral Driven Development," 2019 [retrieved Apr. 1, 2025], pp. 1-56, downloaded from <url>:https://www.diva-portal.org/smash/record.jsf?pid=diva2%3A1330189&dswid=1233. (Year: 2019).*

Magnus Harlin, "Testing and Gherkin in agile projects," 2016 [retrieved Apr. 1, 2025], pp. 1-61, downloaded from <url>:https://www.diva-portal.org/smash/record.jsf?pid=diva2%3A908749&dswid=5549. (Year: 2016).*

Jason Tong et al., "Test compaction techniques for assertion-based test generation," 2013 [retrieved Apr. 1, 2025], ACM Transactions on Design Automation of Electronic Systems, vol. 19, Issue 1, pp. 1-29, downloaded from <url>:https://dl.acm.org/doi/abs/10.1145/2534397. (Year: 2013).*

Mathias Landhäußer et al., "Connecting User Stories and code for test development," 2012 [retrieved Apr. 1, 2025], Third International Workshop on Recommendation Systems for Software Engineering, pp. 33-37, downloaded from <url>:https://ieeexplore.ieee.org/document/6233406?source=IQplus. (Year: 2012).*

Noriaki Ichida et al., "A Method of Making Single Function Tests for Constituting Scenario Tests," 2013 [retrieved Apr. 1, 2025], IEEE Sixth International Conference on Software Testing, Verification and Validation, pp. 479-480, d<url>:https://ieeexplore.ieee.org/document/6569763?source=IQplus. (Year: 2013).*

\* cited by examiner

RULE BASED AUTOMATION

TECHNICAL FIELD

The disclosed subject matter relates generally to software verification and, more particularly, to the use of rule based automation to help increase verification efficiency.

BACKGROUND

Software verification involves anticipating and testing a series of execution scenarios with the goal of determining whether the test scenarios satisfy certain expected requirements and outcomes. For example, verification of software code may be deemed satisfactory, if certain outcomes match expected values and otherwise unsatisfactory, if defined requirements are not met.

Technical analysis of software code and the various execution paths is generally necessary in order to determine various test scenarios. Depending on the nature of the software code, the number of defined variables, and the complexity of relationships between the variables, multitudes of test scenarios can be identified along multiple execution paths.

A comprehensive verification plan would require for all possible scenarios to be anticipated and separately tested. Testing all possible scenarios separately can be a daunting and time-consuming task. Systems and methods are needed that can help overcome the above challenges by making the verification process more efficient and accurate.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with some implementations of the disclosed subject matter, at least two or more test scenarios may be consolidated, from among the plurality of test scenarios, into a first test scenario based on values defined in a modifiable script. The software code may be documented, utilizing a behavior-driven development (BDD) approach. The documenting of the software code may be performed to provide validation information. The validation information may indicate whether at least the first test scenario results in one or more expected outcomes in view of a first set of constraints applied to the values or the relationships. If so, the first test scenario is validated based on the validation information. Otherwise, an error or notification message or other output may be generated.

In certain embodiments, one or more constraints in the first set of constraints are expressed as one or more validation steps. One or more validation steps may be configured to assert actual behavior of the software code with an expected behavior defined by the one or more expected outcomes. In a first scenario, one or more validation processes following a first validation step may be skipped in response to the actual behavior of the application after the first validation step resulting into the validation processes following a first validation step to be non-executable or invalid. The first validation step comprises a rule assertion step. The first scenario is marked as skipped in an execution report generated in response to the skipped validation step.

At least the first scenario is programmatically updated to pass. The modifiable script is implemented in at least one of: JavaScript Object Notation (JSON) format or comma-separated values (CSV) format. The modifiable script is expressed external to the execution of the software code so that the variable values defined in the modifiable script are editable eliminating the need for editing the plurality of test scenarios. The validating the first test scenario eliminates the need for validating the at least two or more test scenarios. The consolidation of the at least two or more scenarios into the first scenario is achieved by utilizing dynamic rule assertions and execution guards for hierarchical rules defined for the at least two or more scenarios. The execution guards for hierarchical rules are defined based on at least one of a criteria, condition, or rule established by a human user based in the human user's analysis of the software code.

Implementations of the current subject matter may include, without limitation, systems and methods consistent with the above methodology and processes, including one or more features and articles that comprise a tangibly embodied machine or computer-readable medium operable to cause one or more machines (e.g., computers, processors, etc.) to result in operations disclosed herein, by way of, for example, logic code or one or more computing programs that cause one or more processors to perform one or more of the disclosed operations or functionalities. The machines may exchange data, commands or other instructions via one or more connections, including but not limited to a connection over a network.

The details of one or more variations of the subject matter described herein are set forth in the accompanying drawings and the description below. Other features and advantages of the subject matter described herein will be apparent from the description and drawings, and from the claims. The disclosed subject matter is not, however, limited to any particular embodiment disclosed.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations as provided below.

The figures may not be to scale in absolute or comparative terms and are intended to be exemplary. The relative placement of features and elements may have been modified for the purpose of illustrative clarity. Where practical, the same or similar reference numbers denote the same or similar or equivalent structures, features, aspects, or elements, in accordance with one or more embodiments.

DETAILED DESCRIPTION OF EXAMPLE IMPLEMENTATIONS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
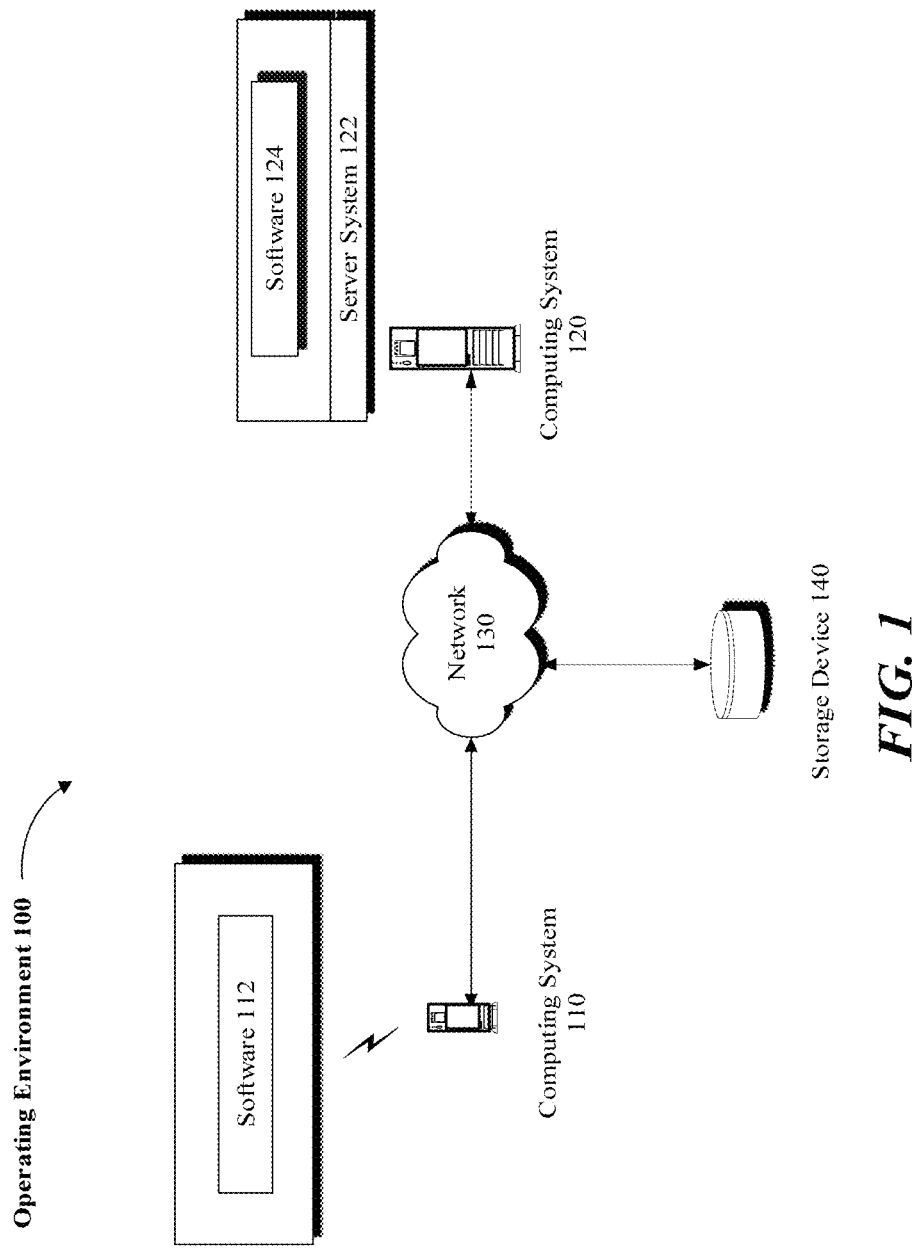
FIG. 1 illustrates an example operating environment in accordance with one or more embodiments, wherein a software code can be verified and tested.

Referring to FIG. 1, an example operating environment 100 is illustrated in which a computing system 110 may be used by a user to interact with software 112 (e.g., verification or test tool) being executed on computing system 110. The computing system 110 may be a general purpose computer or other communication capable computing device configured for executing logic code for the purpose of testing or verifying software code stored on one or more transitory or non-transitory data storage mediums, such as storage device 140. Software 112 may be implemented on a web browser, or as a dedicated app or other type of software application running either fully or partially on computing system 110.

Computing system 110 may communicate over a network 130 to access data (e.g., software code to be tested) stored on storage device 140 or to access services provided by a computing system 120. Depending on implementation, storage device 140 may be local to, remote to, or embedded in one or more of computing systems 110 or 120. A server system 122 may be configured on computing system 120 to service one or more requests submitted by computing system 110 or software 112 (e.g., client systems) via network 130. Network 130 may be implemented over a local or wide area network (e.g., the Internet).

Computing system 120 and server system 122 may be implemented over a centralized or distributed (e.g., cloud-based) computing environment as dedicated resources or may be configured as virtual machines that define shared processing or storage resources. Execution, implementation or instantiation of software 124, or the related features and components (e.g., software objects), over server system 122 may also define a special purpose machine that provides remotely situated client systems, such as computing system 110 or software 112, with access to a variety of data and services (e.g., software verification or testing tools) as provided below.

In accordance with one or more implementations, the provided services by the special purpose machine or software 124 may include providing a user, using computing system 110 or software 112, with the ability to run multiple test scenarios in order to verify the accuracy and validity of various execution paths in a software under test, for example, as when a user navigates through various execution paths (i.e., user journey). As defined here, a user journey refers to one or more paths a user may take to reach a goal when using a particular software application (e.g., navigate through a website). User journeys may, for example, be used in designing websites to identify the different ways to enable the users to achieve their goal as quickly and easily as possible.

A path in a user journey can include multiple steps which a user performs to reach their goal. A step forms a single action performed by the web site or the user on a path towards a goal. The internal state of a software application is altered when a user interacts with it. A complex user journey comprises multiple steps which increase the potential of unexpected application behavior. To ensure that a software code (e.g., an application or website) behaves as intended under different user journeys, the software code is tested. The testing is to ensure that the software code performs as expected or if it fails for the failure to be handled gracefully based on an acceptable user experience.

As noted earlier, traditionally testing a complex software code with many execution paths or user journeys would involve performing all the steps in all execution paths one at a time. This conventional approach to testing or verification is substantially time-consuming and error-prone. As provided in further detail below, an innovative approach is provided for verifying different paths in software code using automated scripts or tests that help avoid the need for user interaction as part of the user journey. This approach makes automated testing highly accurate, efficient, and free of human errors.

In certain automated testing scenarios, a user is capable of handling subtle differences in an application's expected behavior such as a newly added confirmation message or pages loading slowly due to bad network connectivity. Automated scripts traditionally can follow the steps written for a user journey but fail to handle certain subtle deviation from the expected behavior. A user can intuitively modify the steps taken as part of a user journey when the application is updated over time. Further, an automated script may need to be constantly maintained to match the steps to be taken after the application is updated.

One or more embodiments are implemented using behavior driven development (BDD), which is a software development methodology where an application is documented and designed around the behavior a user expects to experience when interacting with it. This approach encourages teams to use conversation and concrete examples to formalize a shared understanding of how the application should behave. A domain-specific language (DSL) using natural language constructs (e.g., English-like sentences) may be utilized to express the behavior and the expected outcomes as an effective technical practice especially when a proposed problem space is complex. In certain embodiments, BDD as a testing practice may be used to test complex user journeys without compromising the readability and the maintainability of the tests over time.

An example verification tool that supports BDD is Cucumber™ and may be utilized in certain embodiments to read executable specifications written in plain text. By way of example and without limitation, in one or more aspects, Cucumber may be used to validate that the application performs according to the specifications. Test tools other than Cucumber may be also utilized in other embodiments to read and validate executable specifications for software code under test.

As provided herein a verifiable specification may include multiple test examples or scenarios. A scenario may include a list of steps for a test tool (e.g., Cucumber) to work through. The test tool verifies that the application conforms with the specification and generates a report indicating success or failure for one or more scenarios.

For a test tool, such as Cucumber, to understand various scenarios, a scenario may follow some basic syntax rules. In Cucumber testing, such rules are referred to as Gherkin. These rules (whether implanted for Cucumber verification tool or other verification tools) make plain text structured enough for the verification tool to parse and understand. The rules may include documents that are stored in a certain formatted file (e.g., .feature text file) and are typically versioned in source control alongside the application or the software under test.

In the following, by way of example, we may refer to a Gherkin Step as a process that is analogous to a method call or function invocation. Such method may be declared in a *.feature file, for example. In one implementation, a verification tool (e.g., Cucumber) may be used to execute a step in a scenario one at a time in a written sequence. When the tool tries to execute a step, it looks for a matching step definition to execute, where the step definition connects the Gherkin steps to programming code (e.g., using an expression that links the step definition to one of more Gherkin steps).

In one example embodiment, when Cucumber executes a Gherkin step in a scenario, it will look for a matching step definition to execute. Step definitions hard-wire the specification to the implementation. The Gherkin steps may make assertions comparing expected results to actual results for an application under test. In one embodiment, a verification tool (e.g., Cucumber) may not come with an assertion library. Instead, the assertion methods from a unit testing tool may be used.

An executed step by Cucumber (or other verification tool) may have one of the following results:

Success: When a matching step definition is found, the matching step is executed. If the block in the step definition doesn't raise an error, the step is marked as successful (e.g., assigned a color green).

Undefined: When can't find a matching step definition, the step gets marked as undefined (yellow), and all subsequent steps in the scenario are skipped.

Pending: When a step definition's method or function invokes the pending method, the step is marked as pending (yellow, as with undefined ones), indicating that you have work to do. The steps following a pending step are not executed.

Failed: When a step definition's method or function is executed and raises an error, the step is marked as failed (red).

Skipped: Steps that follow undefined, pending, or failed steps are never executed, even if there is a matching step definition. These steps are marked as skipped (cyan). The steps following a skipped step are not executed.

Ambiguous: Step definitions have to be unique for a verification tool to know what to execute. If ambiguous step definitions, the step/scenario will get an "Ambiguous" result, indicating to fix the ambiguity.

In accordance with certain aspects, a scenario may be defined as a concrete example that illustrates a rule (e.g., a business rule that is subject to verification). A scenario may include a list of steps and form an executable specification of the system under test. Since, copying and pasting scenarios to use different values quickly become tedious and repetitive, similar scenarios may be collapsed or consolidated into one or more scenario outlines. A scenario outline may be used to run the same scenario multiple times with different combinations of values.

A scenario outline may include one or more examples (or scenarios). Its steps are interpreted as a template that is never directly run. Instead, the scenario outline is run once for a row in the examples section beneath it (not counting the first header row). In addition, a feature keyword may be utilized to provide a high-level description of a software feature and groups related scenarios. Features may be placed in *.feature files, for example.

During verification, the same steps may be repeated in a number of the scenarios in a feature. Since the steps are repeated in multiple scenarios, it indicates that those steps are not essential to describe the scenarios as they are incidental details. In one implementation, such steps are moved to the background, by grouping them under a background section.

In one or more example implementations, coding instruments referred to as hooks are utilized. A hook may include blocks of code that can run at various points during the verification execution cycle. The hooks are typically used for setup and teardown of the environment before and after a scenario.

Another coding instrument referred to as a tag may be used to organize the features and scenarios for multiple purposes, such as:

Running a subset of scenarios
Restricting hooks to a subset of scenarios
BDD Concepts & Process
User Story: A User Story is a small piece of valuable functionality used for planning and prioritizing work on an agile team. BDD encourages working in rapid iterations, continuously breaking down a user story into small pieces enabling quick development.

Data Personas: Data personas are a detailed description of data attributes for key inputs, pre-conditions, and outputs that are referenced within scenarios. These attributes (and notably the differences between them) drive the scenarios to demonstrate the key business outcomes and capabilities that the software delivers. When it comes to setting up test data for the scenarios, data personas allow assembling a set of precise data under a well-known name. Thus making it a part of a 'ubiquitous language'.

Example Mapping: Before pulling a user story into development, the acceptance criteria may be clarified and confirmed. Example mapping is a technique for fleshing out and gaining clarity around the acceptance criteria for a user story. It is based on the idea that multiple examples of specific cases convey information better than a single bad abstraction of a concept.

User Story Mapping: Story mapping is a better way to work with agile user stories. Accordingly, a simple model may be built that tells a user's journey through the application. This keeps users and their interaction with the application front and center and avoids divergence from the goal of delivering great user experience (herein also referred to as UX).

Conversational Pattern In BDD: Two patterns follow from a typical BDD Scenario Template (i.e., Given a context, When an event happens, Then an outcome should occur). In Context Questioning look for any other context that, when the event happens, will produce a different outcome. It might be an additional context or a context that occurs instead of the one(s) we're considering. In Outcome Questioning, given the context, when the event happens, look for other possible outcomes. These conversational patterns help us explore additional or alternate paths a user journey can take.

Discovery Process: BDD aims to reduce rework by removing defects that occur as a result of improper requirement gathering, ambiguities, handoff, etc. The requirements are analyzed and synthesized to be converted into specifications through discussion and exploration. This forms the Discovery Process.

Specification By Example: In this practice, a verification team collaborates around tables of examples before turning them into feature files. This approach helps avoid duplication in scenarios and maintains focus on what takes place instead of how it takes place.

Rationalization: Rationalization under Cucumber removes duplication by using tables of examples, tables of data conditions, or tables to define pre-conditions.

Outcome, Outputs, Process, Scenarios, Inputs (OOPSI) Mapping

Continuous delivery requires breaking down business goals into smaller goals and values. These form the Value Waypoints. BDD forms an iterative delivery practice by focusing on the Outcome/Value. To reach the value waypoints quickly, the detailed examination of less important details may be deferred until later. The OOPSI Mapping technique may be used to help structure the discovery process, to help ensure focus on the most important things.

Accordingly, the highest value outcome may be found, then the highest value outputs that achieve those outcomes, then the highest value processes that deliver those outputs, then the highest value scenarios and examples that help clarify the required implementation. The above technique helps advance rationalization. The shared processes and relationships between outputs and scenarios are identified and examples are organized around them. The examples rationalize themselves.

Outcomes: The 'how' part of a user story forms a good starting point to represent the outcome Outputs: The value of a system lies in the outputs of a process.

Process: General exploration is carried out at the process level to see how the processes and the interactions change to support different outputs.

Scenarios: Scenarios that are relevant to a process are determined and chosen. These scenarios might be paths through the process to generate the outputs or just rules. Specification By Example may be used at this stage.

Inputs (& Preconditions): A scenario using a table of examples may be implemented. This helps identify patterns where different paths of scenarios can be grouped around important outputs. Using the table helps determine if the scenario introduces different permutations of preconditions or can be condensed into a rule.

Using BDD as a testing approach involves mapping a user journey to BDD Scenarios. This follows from the various mapping techniques disclosed herein. These mapping techniques help with the thorough exploration of various permutations and combinations of steps forming the paths of a user journey which are mapped onto Gherkin steps to form a scenario. This approach of mapping a user journey to scenarios ensures coverage of possible paths of a user journey but may have certain shortcomings, such as inability to scale well for complex user journeys, leading to an explosive number of scenarios to cover different permutations and combinations of the steps of a user journey thus making maintenance difficult, and increasing the duration of feedback required to ensure the proper working of a user journey. To address these inefficiencies a rule based scenario testing approach may be employed as provided in further detail below.

Rule Based Scenario Testing

Rules: A path followed by a user journey is composed of various steps. These steps may include cases/constraints/criteria/conditions which need to be satisfied for the step to continue as expected. Such case/constraint/criteria/condition along with the outcome/actions taken on its failure/success form a Rule.

Rule Assertion: The expected result of a rule in a user journey is calculated using the different data/values/inputs its constraint(s) depend on. To compare the expected result of the rule with its actual result, they are represented as steps with assertions in a BDD Scenario. These steps take in the values required to calculate the result of the rules as parameters to their step definitions, such steps form the Rule Assertions.

Dynamic Rule Assertion: Expressing an expected result of a rule as its rule assertion does not scale well for complex rules but instead leads to many scenarios for a single rule. This can be avoided with Dynamic Rule Assertion wherein the Rule Assertion step is rephrased to take in the different cases of the rule as parameters along with the values required to calculate the result of the rule. This enables a single Dynamic Rule Assertion to work across every permutation and combination of values and cases of a rule.

Hierarchical Rules: Rules along a path of a user journey can be independent of each other or bear a relationship between each other. An independent rule can be represented with a rule assertion in a BDD Scenario. The rules to be satisfied as a prerequisite for another rule to be calculated form the Parent Rules. Whereas, the rules which depend on the Parent rules form the Child Rules. The rules which form the parent-child relations are together regarded as Hierarchical Rules.

Execution Guard: The verification tool (e.g., Cucumber) executes steps in a BDD Scenario sequentially. The execution of steps in a scenario forms the basis of verification of application behavior using BDD. If a given step results in success, the verification tool continues executing the steps after it. If a given step results in failure, the verification tool ends the execution of steps in the scenario and the scenario is regarded as failed. A failing assertion raises an error results in the failure of the step. If a given step results in pending/skipped, the verification tool ends the execution of the steps in the scenario.

In this case, the scenario ends up with steps that passed before to the pending/skipped steps and steps that are pending/skipped thereafter. The scenario result is regarded to be pending/skipped. The verification tool may allow setting the result of a step programmatically. Thus, it is possible to create a step definition that conditionally sets the result of a step to success or pending/skipped. Such a step is regarded as the Execution Guard Step and the rule it represents is regarded as the Execution Guard Rule.

Result Override: The results of the execution of BDD Scenarios may be presented as a report. This forms the Execution Report. A scenario may be depicted as pass/success if, for example, every step under it has the step result of success. A scenario is depicted as a fail if at least one step under it has the step result of failed. A scenario is depicted as skipped if, for example, all the steps under it have either pass or pending/skipped as their result.

Result Override is a custom code that is executed before the generation of the execution report. This code is capable of altering the results of steps in a scenario and in turn, set the pass/fail/skipped depiction of a scenario in the report as required.

Approach

Figure 2:
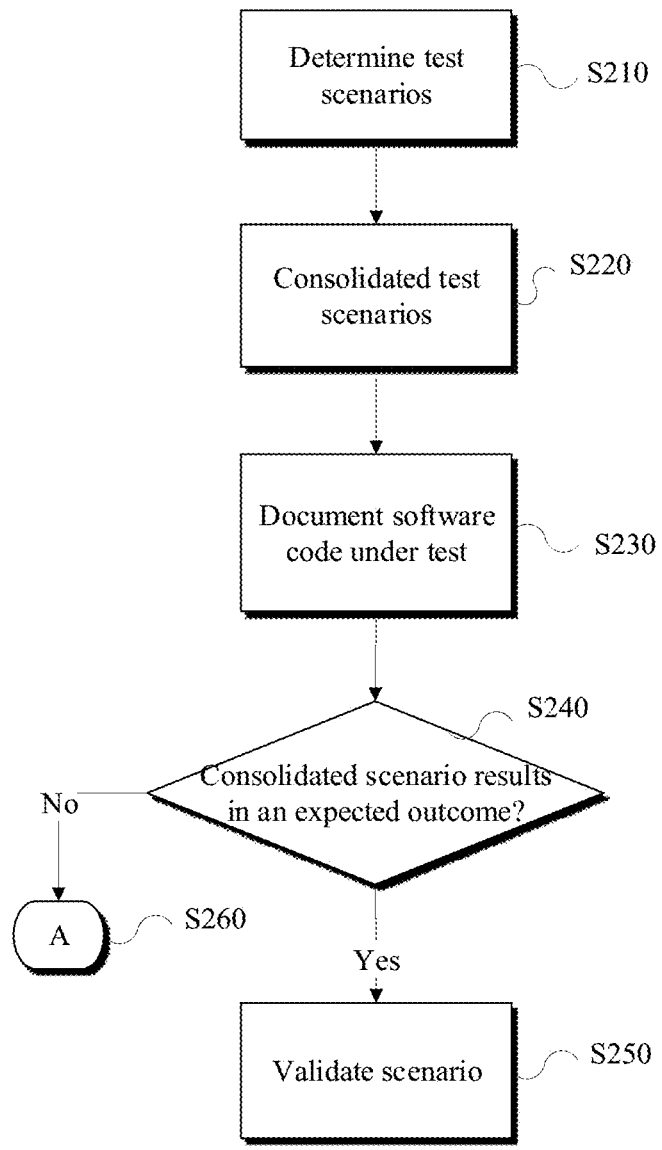
FIG. 2 is an example flow diagram of a method of rule based automation for software verification, in accordance with one embodiment.

Referring to FIG. 2, in accordance with one or more embodiments, a software validation system including one or more processors in communication with one or more non-transitory data storage mediums may be implemented. Software code may be stored in the data storage mediums for the purpose of testing and verification. The one or more processors may be configured to determine a plurality of test scenarios for the software code under test (S210). The test scenarios, depending on implementation, may defined based on at least one of values assigned to one or more variables declared in the software code, relationships defined between the one or more variables, and execution paths leading to one or more outcomes based on the values and the relationships, in response to the software code being executed.

In certain embodiments, at least two or more test scenarios may be consolidated, from among the plurality of test scenarios, into a first test scenario based on values defined in a modifiable script (S220). The software code may be documented, utilizing a behavior-driven development (BDD) approach (S230). The documenting of the software code may be performed to provide validation information. The validation information may indicate whether at least the first test scenario results in one or more expected outcomes in view of a first set of constraints applied to the values or the relationships (S240). If so, the first test scenario is validated based on the validation information (S250). Otherwise, an error or notification message or other output may be generated (S260).

In certain embodiments, one or more constraints in the first set of constraints are expressed as one or more validation steps. One or more validation steps may be configured to assert actual behavior of the software code with an expected behavior defined by the one or more expected outcomes. In a first scenario, one or more validation processes following a first validation step may be skipped, in response to the actual behavior of the application after the first validation step, resulting into the validation processes following a first validation step to be non-executable or invalid. The first validation step comprises a rule assertion step. The first scenario is marked as skipped in an execution report generated in response to the skipped validation step.

In certain embodiments, the rule assertion step is skipped, in response to determining that at least one of a defined criteria, condition, or rule is satisfied. The first scenario is marked as skipped in an execution report generated in response to the validating. At least the first scenario may be programmatically updated to pass. The modifiable script may be implemented in at least one of JavaScript Object Notation (JSON) format or comma-separated values (CSV) format, or other suitable format that provides for proper searching and parsing functionality.

The modifiable script may be expressed external to the execution of the software code so that the variable values defined in the modifiable script are editable eliminating the need for editing the plurality of test scenarios. The validating the first test scenario eliminates the need for validating the at least two or more test scenarios. The consolidation of the at least two or more scenarios into the first scenario is achieved by utilizing dynamic rule assertions and execution guards for hierarchical rules defined for the at least two or more scenarios, in accordance with one or more embodiments. One or more execution guards for hierarchical rules may be defined based on at least one of a criteria, condition, or rule established by a human user based in the human user's analysis of the software code.

As noted earlier, a complex user journey can include different paths with multiple hierarchical rules having different cases. Such a complex user journey will map to a large number of scenarios to cover every permutation and combination of steps. Rule Based Scenario Testing describes an approach to achieve a many-fold reduction in the number of such scenarios by utilizing dynamic rule assertions and execution guards for hierarchical rules. Rule Based Scenario Testing may include the multiple stages as provided in further detail below.

User Story Breakdown: At this stage, a complex user story is broken down into user journeys and their paths. This can be done using multiple techniques. For example, the acceptance criteria for the user story may be finalized using example mapping. Once done, the conversational pattern is used to explore additional or alternate paths of the user journeys. Using a combination of user story mapping, specification by example, and, rationalization using examples, the breakdown is completed. The transformation of user stories into user journeys can also be done using methods such as OOPSI which provides a complete structure for the discovery process. This stage aligns with Outcomes and Outputs as defined by OOPSI.

Rules Exploration: At this stage, steps, and rules are explored using the information from the User Story Breakdown stage. The steps are further explored using examples from the previous stage and the rules governing them are identified. These rules are grouped into Independent Rules and Hierarchical Rules. This stage aligns with the Process as defined by OOPSI.

Rules Mapping: At this stage, the initial BDD Scenario is drafted using the information from the user journey breakdown and rules exploration stages. The steps of a user journey are expressed as steps in a BDD Scenario. Using data personas as parameters, the rules are expressed as assertions. The independent rules without different cases are expressed in the BDD Scenario using rule assertions. Whereas the independent rules with different cases are expressed using dynamic rule assertions. Hierarchical rules cannot be expressed with a single dynamic rule assertion. Thus, these rules are divided into parent and child rules and are added to the BDD Scenario as dynamic rule assertions.

The assertions ensure the scenario fails if the rule to which the scenario maps is not satisfied. The inputs, outputs, and conditions forming the data personas used by the assertions are expressed as Examples in the BDD Scenario or as external sources of information such as JSON, CSV, etc. thus simplifying the maintenance of data personas. This stage helps achieve separation of concerns in the form of steps dictating user actions, assertions verifying application behavior and, data personas forming parameters to the steps and assertions. This stage aligns with Process, Scenario And, Inputs as defined by OOPSI.

Guarding Execution: At this stage, the BDD Scenario is analyzed to identify steps that need execution guards. The initial BDD Scenario from the rules mapping stage may include dynamic rule assertions. These assertions are intended to verify every case of the rule they map. A certain combination of data personas passed to these assertions as parameters may put the application in a state wherein the steps following the assertion cannot be executed successfully. Based on the application logic, this might be expected behavior. In this case, to avoid the following steps from failing, an execution guard is necessary.

In some embodiments, the execution guard rule is explored and its corresponding execution guard step is added after the dynamic assertion. This enables control of the execution and avoids unexpected failure. Since hierarchical rules are mapped to multiple dynamic rule assertions, this stage is crucial to ensure proper control of the execution for the steps between the assertion for the parent rule and the assertion of the child rule. At this stage, the BDD Scenario is finalized and ready for execution.

Overriding Results: At this stage, the final BDD Scenario is analyzed to identify any need for overriding execution results. The execution control realized using execution guard steps in the BDD Scenario might result in the steps past the guard being skipped. This will cause the scenario to be depicted as skipped in the execution report. This might not be the expected depiction based on the acceptance criteria for the user journey. To overcome this, a result override is used to alter the results of the skipped steps conditionally, in turn, altering the scenario depiction in the report.

Rule Based Scenario Testing provides certain benefits over the direct mapping of the user journey to scenario(s). Mapping user journeys to scenario(s) tend to lead to an explosive number of scenarios to cover different permutations and combinations of the steps of a user journey. The usage of dynamic rule assertions, execution guards and, result override as part of rule based scenario testing helps map multiple paths of a user journey and cases of different rules onto a single BDD Scenario.

Rule Based Scenario Testing achieves separation of concerns in the form of, steps dictating user actions, assertions verifying application behavior, and data personas forming parameters to the steps and assertions. This simplifies the maintenance of the BDD Scenario by enabling different concerns to be updated separately. Identifying application issues related to rules in a user journey is eased by the use of dynamic rule assertions.

The reduction in the total number of BDD Scenarios generated as part of Rule Based Scenario Testing along with the dynamic rule assertions greatly reduces the duration of feedback required to ensure the proper working of a user journey. The ability to express application and business rules as rule assertions in the BDD Scenarios improves the usability of BDD as a Test Driven Development approach.

Example of Rule Based Scenario Testing

The following illustrates Rule Based Scenario Testing for different example applications, such as a web-based task management application herein referred by way of example as Who-Do. It is noted that the provided example below is non-limiting in nature and depending on implementation the concepts and example approach provided below may be applied to other verification or test platforms or scenarios.

Who-Do: Who-Do operates to provide a team with capabilities wherein the team members create, assign, and track tasks to closure according to the following details.

Task: A task is defined as informative data bearing a Title and an optional Description. It can be optionally assigned to a user to be worked upon.

Task Status: Task status symbolizes the state a task is in. A newly created task is in the Created state. In this state, the task is regarded as incomplete. Once a task is marked as complete, it enters the Completed state. In this state, the task is regarded as finished. Once a task is deleted, it enters the Deleted state. In this state, the task is regarded as discarded.

Capabilities: Who-Do provides the following capabilities/features:

View Task: The task listing view allows seeing all tasks which are not in a deleted state.

Create Task: The create task view allows creating a new task.

Edit Task: The edit task view allows editing an existing task that is not in a deleted state.

Assign Task: The assign task view allows assigning a task, which is not in a deleted state, to a user.

Update Task Status: The task status view allows modifying/updating the status of a task that is not in a deleted state.

Delete Task: The delete task view allows deleting an existing task thus moving it to deleted state.

Permissions: The application provides a Role-Based Access Control (RBAC) mechanism to control the usage of different capabilities of the application. A user must have the required permission for a capability to be able to use it. Depending on implementation, different permissions may be supported by the application. Examples of permissions may include the following which may be granted selectively. Based on their impact on the application state, the permissions can be represented hierarchically from the most lenient to the strictest as: View<Create, Edit, Assign<Update Task<Delete.

View: A user with this permission can view all the tasks that are not in the deleted state. Using this permission does not modify the state of the application in any way.

Create: A user with this permission is allowed to create a new task. Using this permission modifies the state of the application in a non-destructive way.

Edit: A user with this permission is allowed to edit an existing task that is not in a deleted state. Using this permission modifies the state of the application in a non-destructive way.

Assign: A user with this permission is allowed to assign an existing task that is not in a deleted state to other users. Using this permission modifies the state of the application in a non-destructive way.

Update Task: A user with this permission is allowed to update the status of a task that is not in a deleted state and assigned to the user. Using this permission modifies the state of the application in a non-destructive way.

Delete: A user with this permission is allowed to delete an existing task thus moving it to deleted state. Using this permission modifies the state of the application destructively.

Roles: The permissions provided RBAC are grouped into different Roles. The roles simplify the assignment of permissions to the users of the application. Following are the different roles supported by the application:

Anonymous: This is the default role given to a user. It grants no permissions to the user.

Guest: This role grants permission to View.

Assigner: This role grants permission to: View, Create, Edit, and Assign.

Assignee: This role grants permission to: View and Update Task.

Admin: This role grants permission to: View, Create, Edit, Assign, Update Task, and Delete.

To implement Rule Based Scenario Testing, the following user story statement may be considered: As an admin, I want to find a particular existing task and delete it. In accordance with one or more embodiments, Rule Based Scenario Testing may be used to transform this user story into a BDD Scenario.

User Story Breakdown: The RBAC mechanism of the application is meant to ensure that:

Users with any role can view a task that is not in the deleted state.

Only the user with the admin role can delete a task.

A deleted task is not visible to the user with any role.

Using example mapping along with the above information, one can finalize the acceptance criteria for the user story as:

A user can view the desired task before deletion under the task listing view.

A user can successfully delete the desired task from the delete task view only if the user has the admin role.

The deleted task no longer appears in the task listing view to a user.

Using the conversational pattern, one can conclude the following paths for user journey formed from the user story—note that the naming convention for the paths and other features disclosed herein in for the purpose of example and is provided for ease of understanding:

Happy Path—The path where the user can achieve his goal of deleting a task

Unhappy Path—The path where the user is unable to delete the task

Rules Exploration: The information gained from the user story breakdown stage includes:

The expected workings of the RBAC mechanism

The finalized acceptance criteria for the user story being worked upon

Identification of the paths for the user journey formed from the user story

Using the above data and definitions, it may be concluded, for example, that to delete a task successfully, the user is to have the View and Delete permissions. The View permission will enable the user to find the task, whereas the Delete permission will enable the user to delete the task successfully. These permissions form a hierarchy since the deletion of the task can be carried out only if the user can view the task. This makes View permission a prerequisite to the Delete permission. This complete insight can be expressed as the following rules:

View Rule—The user must have the View permission to view the task

Delete Rule—The user must have the Delete permission to delete the task

The View rule does not depend on any other rule and is thus an Independent rule. The Delete rule depends on the View rule. Thus, the View rule is the Parent rule and the Delete rule is the child rule together forming a hierarchical rule. The different paths for the user journey formed from the user story have the user performing different steps based on the rules enforced by the application. Examples of such paths are provided below.

Happy Path—User has View and Delete Permissions

User logs into the application

User finds the task to be deleted

User deletes task

The deleted task is no longer visible

Unhappy Path—User has no View Permission

User logs into the application

The tasks are not visible since the user lacks View permission

Unhappy Path—User has no Delete Permission

User logs into the application

User finds the task to be deleted

User unable to delete the task since the user lacks Delete permission

Rules Mapping: The information gained from the prior two stages may include:

The expected workings of the RBAC mechanism

The finalized acceptance criteria for the user story being worked upon

Identification of the paths for the user journey formed from the user story

The rules along the paths and the changes they bring to the steps the path follows Using this information, one can start drafting the BDD Scenarios for the different paths of the user journey.

Happy Path—User has View and Delete Permissions

Given a logged-in user

When I find the desired task under the task listing view

Then I delete the desired task

And I cannot find the desired task under the task listing view

Unhappy Path—User has No View Permission

Given a logged-in user

But I cannot find the desired task under the task listing view

Unhappy Path—User has no Delete Permission

Given a logged-in user

When I find the desired task under the task listing view

But I cannot delete the desired task

The rules mapping stage identified two rules along the paths of the user journey: (1) View Rule and (2) Delete Rule. These rules depend on the permissions of the logged-in user that are assigned to the users using roles. To simplify the maintenance and usage of the data personas in the BDD Scenario, the data personas can be expressed externally using a JSON format. An example of an externally express JSON format script as applicable to the example disclosed herein is provided below.

Example: ROLE_PERMISSION_MAPPING.json

```
{
  "Anonymous" : {
    "View": false,
    "Create": false,
    "Edit": false,
    "Assign": false,
    "Update Task": false,
    "Delete": false
  },
  "Guest": {
    "View": true,
    "Create": false,
    "Edit": false,
    "Assign": false,
    "Update Task": false,
    "Delete": false
  },
  "Assigner": {
    "View": true,
    "Create": true,
    "Edit": true,
    "Assign": true,
    "Update Task": false,
    "Delete": false
  },
  "Assignee": {
    "View": true,
    "Create": false,
    "Edit": false,
    "Assign": false,
    "Update Task": true,
    "Delete": false
  },
  "Admin": {
    "View": true,
    "Create": true,
    "Edit": true,
    "Assign": true,
    "Update Task": true,
    "Delete": true
  }
}
```

To ensure the rules are satisfied for different values of the data personas, they are represented using dynamic rule assertions in the BDD Scenario. The View rule is an independent rule and can be expressed as provided herein and below.

The Application Verifies the User's View Permission

The step definition for this assertion is scripted in a way that it results as Success only when the expected application behavior matches the actual application behavior.

| User's View Permission | Are Tasks Actually Shown | Step Result |
|---|---|---|
| false | false | Success |
| false | true | Failed |
| true | false | Failed |
| true | true | Success |

The Delete rule forms a hierarchical rule with the View rule as the parent rule and the Delete rule as the child rule. Since hierarchical rules cannot be expressed with a single dynamic rule assertion, we need a dynamic rule assertion each for View rule and Delete rule. We have already defined the assertion for the View rule which covers the prerequisite for the Delete rule. The dynamic rule assertion for the Delete rule can be expressed as:

The Application Verifies the User's Delete Permission

The step definition for this assertion is scripted in a way that it results as Success only when the expected application behavior matches the actual application behavior.

| User's Delete Permission | Is Delete Actually Allowed | Step Result |
|---|---|---|
| false | false | Success |
| false | true | Failed |
| true | false | Failed |
| true | true | Success |

These dynamic rule assertions will help ensure the application behaves as expected on the user journey. Unlike a rule assertion which handles only a single case, these dynamic rule assertions handle every permutation and combination of data personas thus significantly reducing the number of assertions required in the BDD Scenario.

The updated BDD Scenarios using the rule assertions are:
Happy Path—User has View and Delete Permissions
   Given a logged-in user
   When the application verifies the user's view permission
   Then find the desired task under the task listing view
   When the application verifies the user's delete permission
   Then delete the desired task
   And I cannot find the desired task under the task listing view
Unhappy Path—User has no View Permission
   Given a logged-in user
   When the application verifies the user's view permission
   Then cannot find the desired task under the task listing view
Unhappy Path—User has no Delete Permission
   Given a logged-in user
   When the application verifies the user's view permission
   Then find the desired task under the task listing view
   When the application verifies the user's delete permission
   Then cannot delete the desired task
Guarding Execution The initial draft of the BDD Scenario from the rules mapping stage may include three BDD Scenarios for the different paths the user journey takes. This may include BDD Scenarios for:

Happy Path—User has View and Delete Permissions
Unhappy Path—User has no View Permission
Unhappy Path—User has no Delete Permission Assuming the application behaves as expected, in one embodiment, the three BDD Scenarios may be analyzed. For the Happy Path—User has View and Delete Permissions, one can draw the following observations:

The user expects to be able to view the task after the assertion for View rule
   The user expects to be able to delete the task after the assertion for Delete rule For the Unhappy Path—User has no View Permission, one can draw the following observations:

The user expects to not be able to view the task after the assertion for View rule
   The user cannot proceed to delete the task since it's not visible For the Unhappy Path—User has no Delete Permission, one can draw the following observations:

The user expects to be able to view the task after the assertion for View rule
   The user expects to not be able to delete the task after the assertion for Delete rule
   The user cannot proceed to delete the task since the application restricts the user from deleting it (By disabling the functionality/Presenting an alert for the delete action etc.)

From these observations, one can conclude that the unhappy paths of the user journey differ from the happy path, for example, by the application disallowing progress based on expected behavior. These restrictions of progress due to the application behavior can be defined as rules governing the flow along the path of the user journey:

Task Display Restriction Rule—The application does not display the tasks
   Delete Restriction Rule—The application does not allow deletion of the tasks Execution guards enable programmatic control on the flow/execution of steps in a BDD Scenario. These restriction rules form the execution guard rules which can be expressed in a BDD Scenario using execution guard steps. For example, the execution guard step for the Task Display Restriction rule can be expressed as:

Then continue onwards if the tasks are displayed

The step definition for this execution guard step is scripted in a way that it results as Success when the application actually displays the tasks and results as Skipped otherwise. This ensures the guard step behaves as expected for every BDD Scenario.

| Are Tasks Actually Shown | Step Result |
|---|---|
| true | Success |
| false | Skipped |

The execution guard step for the Delete Restriction rule can be expressed as:

Then continue onwards if the deletion of task is allowed

The step definition for this execution guard step is scripted in a way that it results as Success if the application actually allows deletion of the task else results as Skipped. This ensures the guard step behaves as expected for every BDD Scenario.

| Is Delete Actually Allowed | Step Result |
|---|---|
| true | Success |
| false | Skipped |

The restriction rules relate closely to the different rules and the behavior of the application in response to the enforcement of the rules. Thus, they may be added immediately after the dynamic rule assertions they relate to. The execution control offered by the guard steps enables merging the three BDD Scenarios into a single scenario that covers the three potential paths of the user journey.

Figure 3:
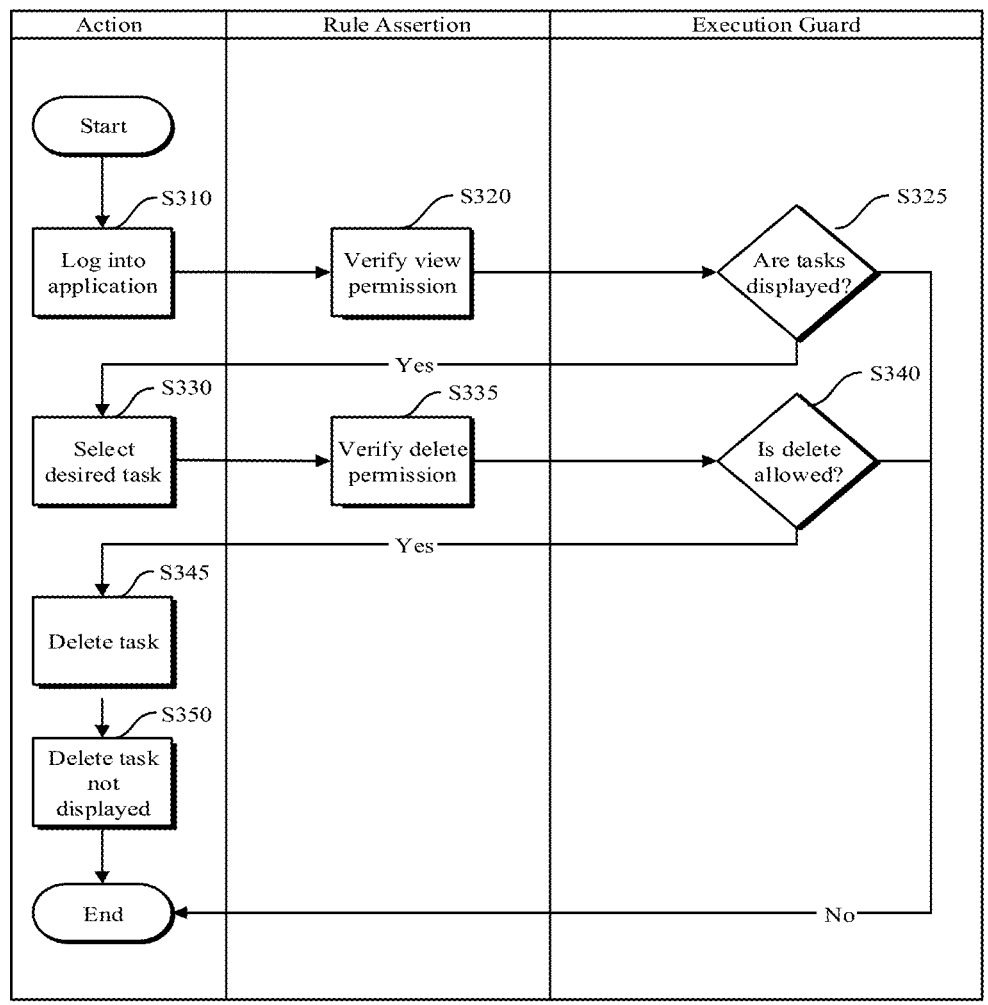
FIG. 3 is an example diagram depicting multiple stages of verification using rule based automation, in accordance with one embodiment.

Referring to FIG. 3, the Final BDD Scenario may be expressed as:

Given a logged-in user (S310)

When the application verifies the user's view permission (S320)

Then continue onwards if the tasks are displayed (S325)

And find the desired task under the task listing view (S330)

When the application verifies the user's delete permission (S335)

Then continue onwards if the deletion of task is allowed (S340)

And delete the desired task (S345)

Then cannot find the desired task under the task listing view (S350)

Assuming the application behaves as expected, the final BDD Scenario behaves as provided below.

For the Happy Path—User has View and Delete Permissions

| Step No. | Result | Reason/Remark |
|---|---|---|
| 1 | Success | The user logs in successfully |
| 2 | Success | The user has the view permission as expected |
| 3 | Success | The application displays the tasks to the user |
| 4 | Success | The user is able to find the desired task |
| 5 | Success | The user has the delete permission as expected |
| 6 | Success | The application allows deletion of the task to the user |
| 7 | Success | The user is able to delete the task |
| 8 | Success | The user is unable to see the task after deletion |

For the Unhappy Path—User has no View Permission

| Step No. | Result | Reason/Remark |
|---|---|---|
| 1 | Success | The user logs in successfully |
| 2 | Success | The user does not have the view permission as expected |
| 3 | Skipped | The application does not display the tasks to the user |
| 4 | Skipped | Skipped due to step 3 |
| 5 | Skipped | Skipped due to step 3 |
| 6 | Skipped | Skipped due to step 3 |
| 7 | Skipped | Skipped due to step 3 |
| 8 | Skipped | Skipped due to step 3 |

For the Unhappy Path—User has no Delete Permission

| Step No. | Result | Reason/Remark |
|---|---|---|
| 1 | Success | The user logs in successfully |
| 2 | Success | The user has the view permission as expected |
| 3 | Success | The application displays the tasks to the user |
| 4 | Success | The user is able to find the desired task |
| 5 | Success | The user does not have the delete permission as expected |
| 6 | Skipped | The application does not allow the deletion of the task to the user |
| 7 | Skipped | Skipped due to step 6 |
| 8 | Skipped | Skipped due to step 6 |

The BDD Scenario may be depicted as failed, if the application behaves in an unexpected way. In that case, The result status of the steps will help isolate the discrepancy between the expected behavior exemplified by the BDD Scenario and the actual behavior of the application.

Overriding Results

In accordance with one or more aspects, the final BDD Scenario developed as part of the guarding execution stage covers the various paths of the user journey.

Happy Path—User has View and Delete Permissions
Unhappy Path—User has no View Permission
Unhappy Path—User has no Delete Permission On execution, the report will show a different depiction of the BDD Scenario based on the path:

For Happy Path—User has View and Delete Permissions, Since every step in the BDD Scenario resulted as Success, the Scenario is depicted as Pass For Unhappy Path—User has no View Permission, Since step 3 onwards resulted as Skipped, the Scenario is depicted as Skipped For Unhappy Path—User has no Delete Permission, Since step 6 onwards resulted as Skipped, the Scenario is depicted as Skipped For any unexpected application behavior, the Scenario is depicted as Failed due to the Failed result of one of its steps.

In this example, the skipped depiction of the BDD Scenario in the execution report is for the paths where the application behaved as expected. Thus, these paths are to be depicted as Pass instead of Skipped. This can be achieved using a Report Override function that will update the result for the Skipped steps from Skipped to Success. This in turn will update the depiction of the Scenario to Pass.

SUMMARY

The example Who-Do application features a Role Based Access Control with 5 different roles. Each role provides a user with one or more of the 6 available permissions.

The user story statement comprises a user journey with 3 different paths dictated by the Role-Based Access Control mechanism, where an administrator would want to find a particular existing task and delete it. Using direct mapping of the user story to BDD Scenario will lead to an explosion of BDD Scenarios for the permutation and combinations of:

5 roles
2 permissions (View and Delete)
2 possible cases for a permission (Granted and Not Granted)

That is: A total of 20 Scenarios.

This total number of scenarios may be reduced using the disclosed concepts, processes, and systems provided herein, using Rule Based Scenario Testing:
- 2 rules dictating the application behavior on the user journey were identified.
- The 5 different roles, each with their 6 granted/not granted permissions were mapped to a 1 ROLES_PERMISSION_MAPPING JSON which forms the data personas.
- 2 dynamic rule assertions were formulated to handle 8 different cases of the 2 rules.
- 2 execution guard steps were formulated to handle 4 different restriction rules.
- That is: The 20 Scenarios may be merged and represented as a single BDD Scenario in this example, as summarized in FIG. 3.

Figure 4:
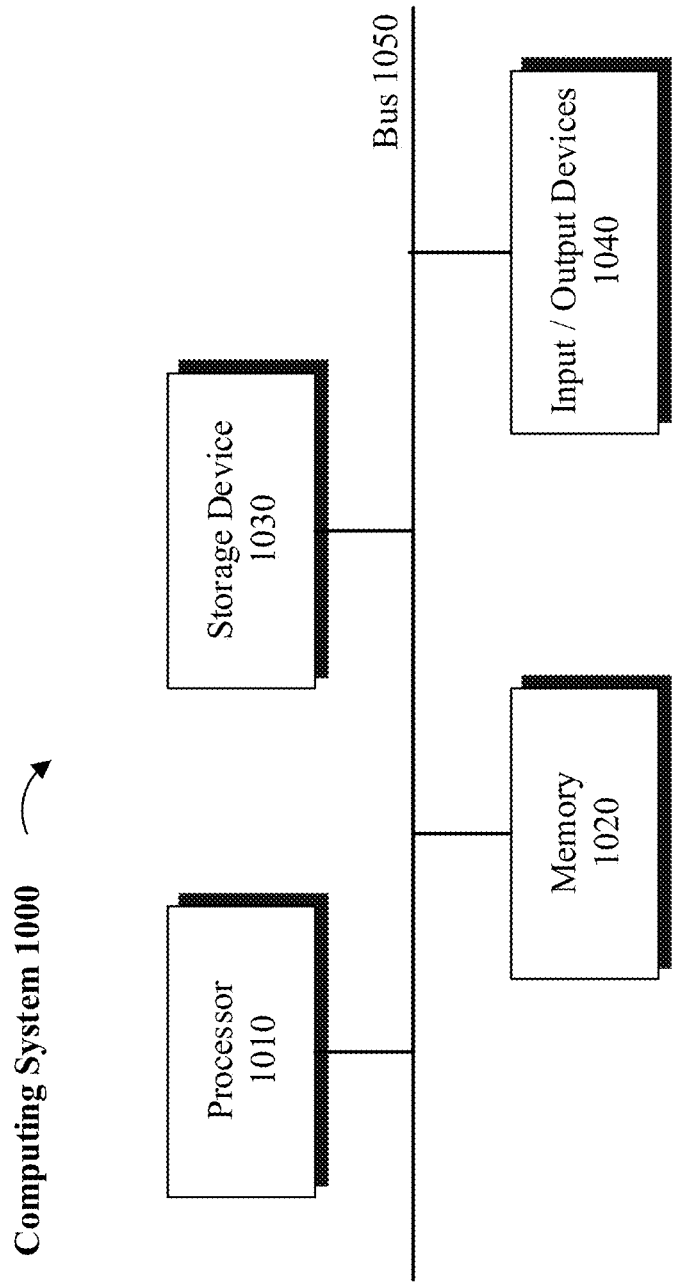
FIG. 4 is a block diagram of an example computing system that may be utilized to perform one or more computing operations or processes as consistent with one or more disclosed features.

Referring to FIG. 4, a block diagram illustrating a computing system 1000 consistent with one or more embodiments is provided. The computing system 1000 may be used to implement or support one or more platforms, infrastructures or computing devices or computing components that may be utilized, in example embodiments, to instantiate, implement, execute or embody the methodologies disclosed herein in a computing environment using, for example, one or more processors or controllers, as provided below.

As shown in FIG. 4, the computing system 1000 can include a processor 1010, a memory 1020, a storage device 1030, and input/output devices 1040. The processor 1010, the memory 1020, the storage device 1030, and the input/output devices 1040 can be interconnected via a system bus 1050. The processor 1010 is capable of processing instructions for execution within the computing system 1000. Such executed instructions can implement one or more components of, for example, a cloud platform. In some implementations of the current subject matter, the processor 1010 can be a single-threaded processor. Alternately, the processor 1010 can be a multi-threaded processor. The processor 1010 is capable of processing instructions stored in the memory 1020 and/or on the storage device 1030 to display graphical information for a user interface provided via the input/output device 1040.

The memory 1020 is a computer readable medium such as volatile or non-volatile that stores information within the computing system 1000. The memory 1020 can store data structures representing configuration object databases, for example. The storage device 1030 is capable of providing persistent storage for the computing system 1000. The storage device 1030 can be a floppy disk device, a hard disk device, an optical disk device, or a tape device, or other suitable persistent storage means. The input/output device 1040 provides input/output operations for the computing system 1000. In some implementations of the current subject matter, the input/output device 1040 includes a keyboard and/or pointing device. In various implementations, the input/output device 1040 includes a display unit for displaying graphical user interfaces.

According to some implementations of the current subject matter, the input/output device 1040 can provide input/output operations for a network device. For example, the input/output device 1040 can include Ethernet ports or other networking ports to communicate with one or more wired and/or wireless networks (e.g., a local area network (LAN), a wide area network (WAN), the Internet).

In some implementations of the current subject matter, the computing system 1000 can be used to execute various interactive computer software applications that can be used for organization, analysis and/or storage of data in various (e.g., tabular) format (e.g., Microsoft Excel®, and/or any other type of software). Alternatively, the computing system 1000 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 1040. The user interface can be generated and presented to a user by the computing system 1000 (e.g., on a computer screen monitor, etc.).

One or more aspects or features of the subject matter disclosed or claimed herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that may be executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server may be remote from each other and may interact through a communication network. The relationship of client and server arises by virtue of computer programs running on the respective computers and having a client-server relationship to each other.

These computer programs, which may also be referred to as programs, software, software applications, applications, components, or code, may include machine instructions for a programmable controller, processor, microprocessor or other computing or computerized architecture, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

Terminology

When a feature or element is herein referred to as being "on" another feature or element, it may be directly on the other feature or element or intervening features and/or elements may also be present. In contrast, when a feature or element is referred to as being "directly on" another feature or element, there may be no intervening features or elements present. It will also be understood that, when a feature or element is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present.

Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps or processes), these features/elements should not be limited by these terms as an indication of the order of the features/elements or whether one is primary or more important than the other, unless the context indicates otherwise. These terms may be used to distinguish one feature/element from another feature/element. Thus, a first feature/element discussed could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite of the detailed nature of the example embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

COPYRIGHT & TRADEMARK NOTICES

A portion of the disclosure of this patent document may contain material, which is subject to copyright protection. The applicant has no objection to the reproduction of the patent documents or the patent disclosure as it appears in the Patent and Trademark Office patent files or records, but reserves all copyrights whatsoever. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

What is claimed is:

1. A software validation system comprising one or more processors in communication with one or more non-transitory data storage mediums in which software instructions are stored, the one or more processors configured to execute operations comprising:

determining a plurality of test scenarios for a software code under test, a test scenario of the plurality of test scenarios comprising a script sequence of natural language text constructs of a programming language, wherein one or more natural language text constructs of the script sequence are configured to evaluate:
      values assigned to one or more variables declared in the software code,
      relationships defined between the one or more variables, and
      execution paths leading to one or more outcomes based on the values and the relationships, in response to the software code being executed;

documenting the software code by utilizing a behavior-driven development (BDD) approach;

generating a rule associated with at least one natural language text construct of the one or more natural language text constructs, wherein the rule verifies a value assigned to a variable of the one or more variables declared in the software code or verifies one or more of the relationships defined between the one or more variables;

generating an assertion of the rule, wherein the assertion is the at least one natural language text construct, wherein the assertion is configured to cause a software code operation responsive to the value assigned to the variable of the one or more variables or the one or more relationships, wherein the assertion is configured to be evaluated as successful if the software code operation matches an expected software code operation, and wherein the assertion is configured to be evaluated as a failure if the software code operation does not match the expected software code operation; and consolidating, based on the assertion, at least a first test scenario and a second test scenario to form a consolidated test scenario, wherein the consolidated test scenario is executed to produce a result of each of the at least the first test scenario and the second test scenario, depending on the values assigned to the one or more variables, the consolidating comprising:
      identifying a first natural language text construct in the first test scenario and a second natural language text construct in the second test scenario,
         wherein the first natural language text construct is configured to execute a first software code operation associated with the rule,
         wherein the second natural language text construct is configured to execute a second software code operation associated with the rule, and
         wherein the second software code operation comprises not performing the first software code operation and skipping execution of at least one subsequent natural language text construct;
      inserting the assertion into the consolidated test scenario; and
      inserting a conditional natural language text construct into the consolidated test scenario after the assertion, wherein evaluating the conditional natural language text construct causes execution of either the first software code operation or the second software code operation; and generating an electronic execution report,
wherein the electronic execution report is configured to provide a result of an execution of at least one consolidated natural language text construct of the consolidated test scenario,
wherein the execution report is configured to provide a successful result if the first software code operation is executed successfully, and
wherein the execution report is configured to provide a skip result if the second software code operation is executed successfully.

2. The software validation system of claim 1, wherein the script sequence is implemented in at least one of: JavaScript Object Notation (JSON) format or comma-separated values (CSV) format.

3. The software validation system of claim 1, wherein the script sequence is expressed external to the execution of the software code so that the values assigned to the one or more variables declared in the software code are editable eliminating a need for editing the plurality of test scenarios.

4. The software validation system of claim 1, further comprising validating the consolidated scenario, wherein the validating eliminates a need for validating at least two or more test scenarios of the plurality of test scenarios.

5. The software validation system of claim 1, wherein a particular variable of the one or more variables relates to a user permission relating to a software application, wherein a particular value assigned to the particular variable indicates whether a user is allowed to access or modify a state of the software application.

6. The software validation system of claim 5, wherein the particular variable of the one or more variables is view, create, edit, assign, delete or update.

7. The software validation system of claim 1, wherein the rule verifies whether t a user permission is enabled for a role assigned to a user.

8. The software validation system of claim 7, wherein the rule verifies whether the user permission is enabled by accessing a computer-based list of roles and associated user permissions.

9. The software validation system of claim 1, wherein the rule is a first rule, wherein the assertion of the rule is a first assertion, and further comprising generating a second rule associated with at least one first natural language text construct of the sequence, wherein the second rule verifies a first value assigned to a variable declared in the software code; generating a second assertion of the second rule, wherein the second assertion is a second natural language text construct of the programming language, wherein the second assertion is evaluated only if the first assertion is evaluated as successful.

10. A system comprising:
at least one programmable processor; and
a non-transitory machine-readable medium storing instructions that, when executed by the at least one programmable processor, cause the at least one programmable processor to perform operations comprising:
determining a plurality of test scenarios for a software code under test, a test scenario of the plurality of test scenarios comprising a script sequence of natural language text constructs of a programming language, wherein one or more natural language text constructs of the script sequence are configured to evaluate:
values assigned to one or more variables declared in the software code,
relationships defined between the one or more variables, and
execution paths leading to one or more outcomes based on the values and the relationships, in response to the software code being executed;
documenting the software code by utilizing a behavior-driven development (BDD) approach;
generating a rule associated with at least one natural language text construct of the one or more natural language text constructs, wherein the rule verifies a value assigned to a variable of the one or more variables declared in the software code or verifies one or more of the relationships defined between the one or more variables;
generating an assertion of the rule, wherein the assertion is the at least one natural language text construct, wherein the assertion is configured to cause a software code operation responsive to the value assigned to the variable of the one or more variables or the one or more relationships, wherein the assertion is configured to be evaluated as successful if the software code operation matches an expected software code operation, and wherein the assertion is configured to be evaluated as a failure if the software code operation does not match the expected software code operation; and
consolidating, based on the assertion, at least a first test scenario and a second test scenario to form a consolidated test scenario, wherein the consolidated test scenario is executed to produce a result of each of the at least the first test scenario and the second test scenario, depending on the values assigned to the one or more variables, the consolidating comprising:
identifying a first natural language text construct in the first test scenario and a second natural language text construct in the second test scenario
wherein the first natural language text construct is configured to execute a first software code operation associated with the rule,
wherein the second natural language text construct is configured to execute a second software code operation associated with the rule, and
wherein the second software code operation comprises not performing the first software code operation and skipping execution of at least one subsequent natural language text construct;
inserting the assertion into the consolidated test scenario; and
inserting a conditional natural language text construct into the consolidated test scenario after the assertion, wherein evaluating the conditional natural language text construct causes execution of either the first software code operation or the second software code operation; and
generating an electronic execution report,
wherein the electronic execution report is configured to provide a result of an execution of at least one consolidated natural language text construct of the consolidated test scenario,
wherein the execution report is configured to provide a successful result if the first software code operation is executed successfully, and
wherein the execution report is configured to provide a skip result if the second software code operation is executed successfully.

11. A computer program product comprising a non-transitory machine-readable medium storing instructions that, when executed by at least one programmable processor, cause the at least one programmable processor to perform operations comprising:
- determining a plurality of test scenarios for a software code under test, a test scenario of the plurality of test scenarios comprising a script sequence of natural language text constructs of a programming language, wherein one or more natural language text constructs of the script sequence are configured to evaluate:
  - values assigned to one or more variables declared in the software code,
  - relationships defined between the one or more variables, and
  - execution paths leading to one or more outcomes based on the values and the relationships, in response to the software code being executed;
- documenting the software code by utilizing a behavior-driven development (BDD) approach;
- generating a rule associated with at least one natural language text construct of the one or more natural language constructs, wherein the rule verifies a value assigned to a variable of the one or more variables declared in the software code or verifies one or more of the relationships defined between the one or more variables;
- generating an assertion of the rule, wherein the assertion is the at least one natural language text construct, wherein the assertion is configured to cause a software code operation responsive to the value assigned to the variable of the one or more variables or the one or more relationships, wherein the assertion is configured to be evaluated as successful if the software code operation matches an expected software code operation, and wherein the assertion is configured to be evaluated as a failure if the software code operation does not match the expected software code operation; and
- consolidating, based on the assertion, at least a first test scenario and a second test scenario to form a consolidated test scenario, wherein the consolidated test scenario is executed to produce a result of each of the at least the first test scenario and the second test scenario, depending on the values assigned to the one or more variables, the consolidating comprising:
  - identifying a first natural language text construct in the first test scenario and a second natural language text construct in the second test scenario,
  - wherein the first natural language text construct is configured to execute a first software code operation associated with the rule,
  - wherein the second natural language text construct is configured to execute a second software code operation associated with the rule, and
  - wherein the second software code operation comprises not performing the first software code operation and skipping execution of at least one subsequent natural language text construct;
  - inserting the assertion into the consolidated test scenario; and
  - inserting a conditional natural language text construct into the consolidated test scenario after the assertion, wherein evaluating the conditional natural language text construct causes execution of either the first software code operation or the second software code operation; and
- generating an electronic execution report,
- wherein the electronic execution report is configured to provide a result of an execution of at least one consolidated natural language text construct of the consolidated test scenario,
- wherein the execution report is configured to provide a successful result if the first software code operation is executed successfully, and
- wherein the execution report is configured to provide a skip result if the second software code operation is executed successfully.

* * * * *